United States Patent
Kar et al.

(10) Patent No.: US 11,362,803 B2
(45) Date of Patent: Jun. 14, 2022

(54) METHOD AND SYSTEM FOR PROVIDING EXPLANATION FOR OUTPUT GENERATED BY AN ARTIFICIAL INTELLIGENCE MODEL

(71) Applicant: Wipro Limited, Bangalore (IN)

(72) Inventors: Sibsambhu Kar, Bangalore (IN); Manjunath Ramachandra Iyer, Bangalore (IN); Narendra Narasimha Rao, Bangalore (IN)

(73) Assignee: Wipro Limited, Bangalore (IN)

(*) Notice: Subject to any disclaimer, the term of this patent is extended or adjusted under 35 U.S.C. 154(b) by 602 days.

(21) Appl. No.: 16/370,829

(22) Filed: Mar. 29, 2019

(65) Prior Publication Data
US 2020/0313849 A1    Oct. 1, 2020

(30) Foreign Application Priority Data
Mar. 29, 2019  (IN) .............................. 201941012663

(51) Int. Cl.
*H04L 29/06* (2006.01)
*H04L 9/00* (2022.01)
(Continued)

(52) U.S. Cl.
CPC .............. *H04L 9/008* (2013.01); *G06N 3/08* (2013.01); *G06N 20/00* (2019.01); *H04L 9/0819* (2013.01); *H04L 9/30* (2013.01)

(58) Field of Classification Search
CPC ......... H04L 9/008; H04L 9/0819; H04L 9/30; G06N 3/08; G06N 20/00
See application file for complete search history.

(56) References Cited

U.S. PATENT DOCUMENTS

2007/0053513 A1* 3/2007 Hoffberg ............ G06K 9/00369
                                                      380/201
2015/0088795 A1* 3/2015 Golovashkin ............ G06N 3/08
                                                      706/21
(Continued)

OTHER PUBLICATIONS

Nahua Kang, "Introducing Deep Learning and Neural Networks—Deep Learning for Rookies (1)", Jun. 18, 2017, https://towardsdatascience.com/introducing-deep-learning-and-neural-networks-deep-learning-for-rookies-1-bd68f9cf5883, 25 pages (Year: 2017).*

(Continued)

*Primary Examiner* — Chau Le
*Assistant Examiner* — Han Yang
(74) *Attorney, Agent, or Firm* — Finnegan, Henderson, Farabow, Garrett & Dunner, LLP

(57) ABSTRACT

This disclosure relates to method and system for providing explanation for output generated by artificial intelligence (AI) model. The method may include receiving encrypted input data and a public encryption key from a client device, wherein the encrypted input data is encrypted using the public encryption key. The method may further include generating an encrypted AI model by encrypting an AI model using the public encryption key. The method may further include generating an encrypted output and an encrypted feature data based on the encrypted input data using the encrypted AI model, and generating an encrypted explanation for the encrypted output based on the encrypted feature data. The method may further include providing the encrypted output and the encrypted explanation to the client device for rendering, wherein the encrypted output and the encrypted explanation are decrypted by the client device using a private encryption key.

19 Claims, 8 Drawing Sheets

(51) Int. Cl.
  *G06N 20/00*  (2019.01)
  *G06N 3/08*  (2006.01)
  *H04L 9/08*  (2006.01)
  *H04L 9/30*  (2006.01)

(56) References Cited

U.S. PATENT DOCUMENTS

2019/0304156 A1* 10/2019 Amer ................... G06N 3/0445
2020/0053277 A1* 2/2020 Shin ................... H04N 5/23206
2021/0097894 A1* 4/2021 Iyer ..................... G06N 3/0454

OTHER PUBLICATIONS

Nahua Kang, "Multi-Layer Neural Networks with Sigmoid Function—Deep Learning for Rookies (2)", Jun. 27, 2017, https://towardsdatascience.com/multi-layer-neural-networks-with-sigmoid-function-deep-learning-for-rookies-2-bf464f09eb7f, 18 pages (Year: 2017).*

Sahdev Kansal, "A Quick Guide to Activation Functions in Deep Learning", Jul. 26, 2020, https://towardsdatascience.com/a-quick-guide-to-activation-functions-in-deep-learning-4042e7addd5b, 19 pages (Year: 2020).*

Dowlin et al., CryptoNets: Applying Neural Networks to Encrypted Data with High Throughput and Accuracy, Proceedings of the 33rd International Conference on Machine Learning, NY, 2016.

CryptoDL: Deep Neural Networks Over Encrypted Data, retrieved from the internet: <arXiv:1711.05189>.

Chou et al., Faster CryptoNets: Leveraging Sparsity for Real-World Encrypted Interference, Department of Computer Science, Stanford University (2018).

Microsoft SEAL, retrieved from the internet Mar. 29, 2019: <https://www.microsoft.com/en-US/research/project/microsoft-seal/>.

HE-Transformerfor NGraph: Enabling Deep Learning on Encrypted Data, retrieved from the internet Mar. 29, 2019: <https://www.intel.ai/he-transformer-for-ngraph-enabling-deep-learning-on-encrypted-data/>.

Duality's Secure Plus Platform, retrieved from the internet Mar. 29, 2019: <https://duality.cloud/products/>.

Efficient Logistic Regression on Large Encrypted Data, retrieved from the internet Mar. 29, 2019: <https://eprint.iacr.org/2018/662.pdf>.

Machine Learning on Encrypted Data, retrieved from the internet Mar. 29, 2019: <https://www.oreilly.com/ideas/machine-learning-on-encrypted-data>.

* cited by examiner

METHOD AND SYSTEM FOR PROVIDING EXPLANATION FOR OUTPUT GENERATED BY AN ARTIFICIAL INTELLIGENCE MODEL

This application claims the benefit of Indian Patent Application Serial No. 201941012663, filed Mar. 29, 2019, which is hereby incorporated by reference in its entirety.

FIELD

This disclosure relates generally to an artificial intelligence (AI) system, and more particularly to a method and a system for providing explanation for an output generated by an AI model.

BACKGROUND

As data analysis assumes greater importance in businesses dynamics, maintaining data privacy and security becomes essential. Various Artificial Intelligence (AI) or Machine Learning (ML) models may be used for performing data analysis. In some instances, these AI or ML models may be implemented in a cloud network. A user may use these AI or ML models by running them on their own user data. However, it is observed that when these AI or ML models are accessed over the cloud network, actual data is consumed, which compromises the security and privacy of the data.

For safety reasons, it is, therefore, advisable to perform data encryption while using the AI or ML models. In other words, an encrypted input data may be fed to an encrypted AI or ML model to generate an encrypted output. As it will be appreciated by those skilled in the art, the actual data need not be exposed for training the AI or ML models or for generating encrypted output using these trained AI or ML models. The AI or ML models may work equally well with encrypted input data, to generate encrypted output. The encrypted output may later be decrypted at the user end. By way of encryption, privacy and security of the data may be ensured. However, when all the data (i.e. the input data, the model, and the output) is in encrypted form, the output may not be adequately explained, and hence, the user may not be able to understand the output. For example, in banking operations, a user may need to check if a customer is eligible for a loan or not. In such cases, the user would not want to expose customer data while using an AI model stored in a cloud network. Accordingly, the user may first encrypt the data to generate encrypted data, for obtaining an encrypted output from the AI model. The encrypted output may be later decrypted at the user end to check whether the customer is eligible for the loan or not. The output may only indicate whether the customer is eligible or not. However, the output is not able to provide the reasoning relied on by the AI model for generating that output.

SUMMARY

In one embodiment, a method of providing explanation for output generated by artificial intelligence (AI) model is disclosed. In one example, the method may include receiving encrypted input data and a public encryption key from a client device, wherein the encrypted input data is encrypted using the public encryption key. The method may further include generating an encrypted AI model by encrypting an AI model using the public encryption key. The method may further include generating an encrypted output and an encrypted feature data based on the encrypted input data using the encrypted AI model. The method may further include generating an encrypted explanation for the encrypted output based on the encrypted feature data. The method may further include providing the encrypted output and the encrypted explanation to the client device for rendering, wherein the encrypted output and the encrypted explanation are decrypted by the client device using a private encryption key.

In one embodiment, a system for providing explanation for output generated by an AI model is disclosed. The system comprises an AI prediction and explanation device in communication with a client device over a communication network. The AI prediction and explanation device further comprises at least one processor and a computer-readable medium storing instructions that, when executed by the at least one processor, cause the at least one processor to perform operations including receiving encrypted input data and a public encryption key from the client device, wherein the encrypted input data is encrypted using the public encryption key. The operations may further include generating an encrypted AI model by encrypting an AI model using the public encryption key. The operations may further include generating an encrypted output and an encrypted feature data based on the encrypted input data using the encrypted AI model. The operations may further include generating an encrypted explanation for the encrypted output based on the encrypted feature data. The operations may further include providing the encrypted output and the encrypted explanation to the client device for rendering, wherein the encrypted output and the encrypted explanation are decrypted by the client device using a private encryption key.

In one embodiment, a non-transitory computer-readable medium storing computer-executable instructions for providing explanation for output generated by an AI model is disclosed. In one example, the stored instructions, when executed by a processor, may cause the processor to perform operations including receiving encrypted input data and a public encryption key from a client device, wherein the encrypted input data is encrypted using the public encryption key. The operations may further include generating an encrypted AI model by encrypting an AI model using the public encryption key. The operations may further include generating an encrypted output and an encrypted feature data based on the encrypted input data using the encrypted AI model. The operations may further include generating an encrypted explanation for the encrypted output based on the encrypted feature data. The operations may further include providing the encrypted output and the encrypted explanation to the client device for rendering, wherein the encrypted output and the encrypted explanation are decrypted by the client device using a private encryption key.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
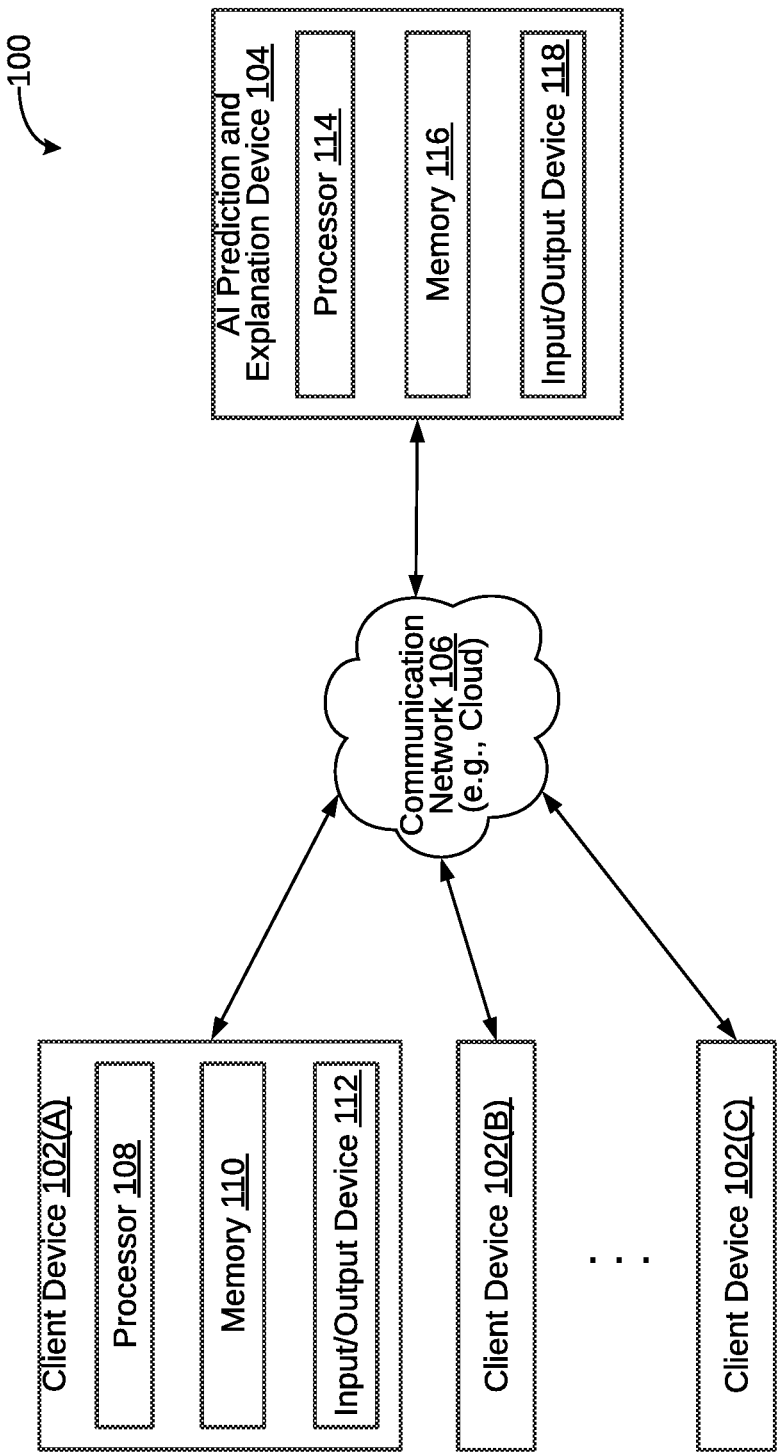
FIG. 1 is a block diagram of an exemplary system for providing explanation for output generated by an artificial intelligence (AI) model, in accordance with some embodiments of the present disclosure.

Referring now to FIG. 1, an exemplary system 100 for providing explanation for output generated by an artificial intelligence (AI) model is illustrated, in accordance with some embodiments of the present disclosure. The system 100 may include one or more client devices 102(A), 102(B) . . . 102(N), collectively referred to as client device 102 in communication with an AI prediction and explanation device 104 over a communication network 106. In particular, the AI prediction and explanation device 104 may be implemented over a cloud for generating an output (e.g., prediction) by employing the AI model based on an input received from a client device 102. Additionally, the AI prediction and explanation device 104 may be configured for providing an explanation for the output generated by the AI model. By way of an example, the client device 102 may provide encrypted input data and an encryption key to the AI prediction and explanation device 104 for encrypting the AI model and for generating encrypted output data along with encrypted explanation based on the encrypted input data using the encrypted AI model. Further, the client device 102 may receive the encrypted output data and the encrypted explanation generated by the AI prediction and explanation device 104 for subsequent decryption and rendering.

As will be described in greater detail in conjunction with FIGS. 2-8, the AI prediction and explanation device 104 may receive the encrypted input data and a public encryption key from the client device 102. The encrypted input data may be encrypted using the public encryption key. The AI prediction and explanation device 104 may further generate the encrypted AI model by encrypting the AI model using the public encryption key. It should be noted that the AI prediction and explanation device 104 may retrieve the pre-trained AI model from a database. The AI prediction and explanation device 104 may further generate the encrypted output and an encrypted feature data based on the encrypted input data, using the encrypted AI model. The AI prediction and explanation device 104 may further generate an encrypted explanation for the encrypted output based on the encrypted feature data. The AI prediction and explanation device 104 may further provide the encrypted output and the encrypted explanation to the client device 102 for rendering. The encrypted output and the encrypted explanation may be decrypted by the client device 102, using a private encryption key.

The client device 102 may include, but may not be limited to server, desktop, laptop, notebook, netbook, smartphone, and mobile phone. In particular, the client device 102 may include one or more processors 108, a computer-readable medium (e.g. a memory) 110, and input/output devices 112. The computer-readable storage medium 110 may store the instructions that, when executed by the one or more processors 108, cause the one or more processors 108 to perform various functions in order to generate encryption keys, encrypt input data, establish secure communication with the AI prediction and explanation device 104 for transmitting the encryption key and the encrypted input data and for receiving the encrypted output (i.e., prediction) and the encrypted explanation for the output from the encrypted AI model, decrypt and render the encrypted output and the encrypted explanation, perform tuning of the encryption algorithm, or facilitate tuning of the encrypted AI model, or the like, in accordance with aspects of the present disclosure. The computer-readable storage medium 110 may also store various data (e.g. input data, encryption algorithm, encrypted input data, public and private encryption keys, decrypted output data, decrypted explanation data, decrypted intermediate feature data, etc.) that may be captured, processed, and/or required by the client device 102. The client device 102 may interact with a user (not shown) via input/output devices 112. The client device 102 may also interact with the AI prediction and explanation device 104 over the communication network 106 for sending and receiving various data.

The AI prediction and explanation device 104 may include, but may not be limited to server, desktop, laptop, notebook, netbook, smartphone, and mobile phone. In particular, the AI prediction and explanation device 104 may include one or more processors 114, a computer-readable medium (e.g. a memory) 116, and input/output devices 118. The computer-readable storage medium 116 may store the instructions that, when executed by the one or more processors 114, cause the one or more processors 114 to train AI model, encrypt AI model, generate the encrypted output based on the encrypted input using the encrypted AI model, generate the encrypted explanation for the encrypted output generated by the AI model, or the like, in accordance with aspects of the present disclosure. The computer-readable storage medium 116 may also store various data (e.g. encrypted AI model data, public encryption key data, encrypted output data, encrypted feature data, encrypted explanation data, approximate AI model data, encrypted intermediate feature data, etc.) that may be captured, processed, and/or required by the AI prediction and explanation device 104. The AI prediction and explanation device 104 may interact with a user (not shown) via input/output devices 118. The AI prediction and explanation device 104 may also interact with the client device 102 over the communication network 106 for sending and receiving various data.

Figure 2:
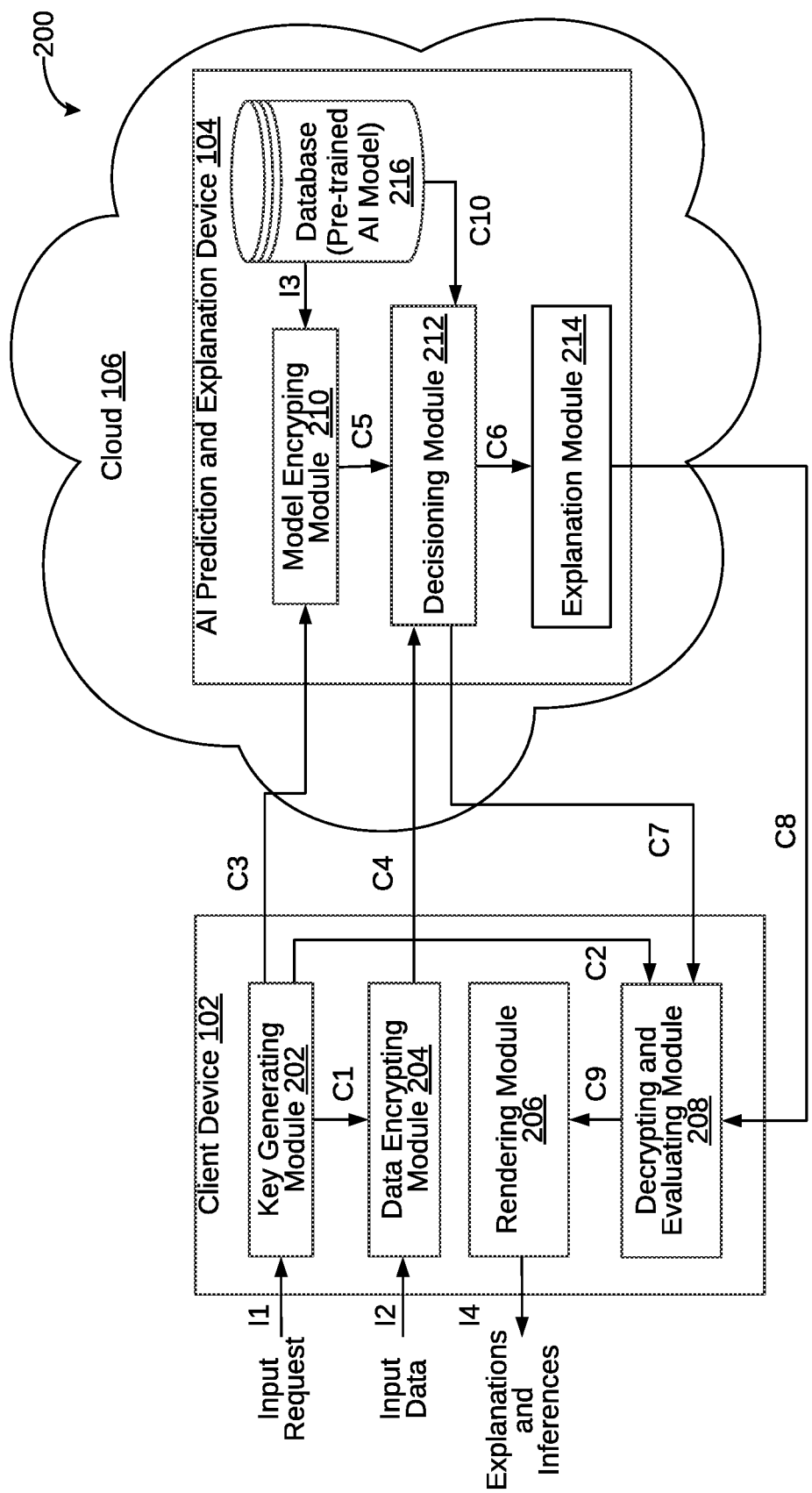
FIG. 2 is a functional block diagram of the exemplary system of FIG. 1, in accordance with some embodiments of the present disclosure.

Referring now to FIG. 2, a functional block diagram of a system 200, analogous to the exemplary system 100 of FIG. 1, is illustrated in accordance with some embodiments of the present disclosure. The system 200 may include a client device 102, and an AI prediction and explanation device 104. In some embodiments, the client device 102 and the AI prediction and explanation device 104 may be communicatively coupled to each other via a cloud network 106. Alternatively, the AI prediction and explanation device 104 may be implemented in the cloud network 106 itself.

In some embodiments, the client device 102 may include various modules that perform various functions so as to receive output and explanation for the received output from an AI model implemented by the AI prediction and explanation device 104. In some embodiments, the client device 102 may include a key generating module 202, a data encrypting module 204, a decrypting and evaluating module 208, and a rendering module 206.

In some embodiments, the key generating module 202 may receive an input request, via an interface I1. The input request may include information about whether a processing function relating to encrypting data is to be performed or not. By way of an example, the processing function may include one or more of generating one or more encryption keys, generating a first numeric input to indicate a level of privacy and security, and a numeric input or parameters required as input for generating the encryption keys. Further, the processing function may relate to encrypting the AI model or encrypting input data. Accordingly, the key generating module 202 may generate one or more public encryption keys and one or more private encryption keys, based on the input request. In some embodiments, the key generating module 202 may generate the one or more encryption keys using homomorphic encryption. It may be noted that the public key may be generated for encrypting the input data and encrypting the AI model (to generate an encrypted AI model). The private encryption key may be generated for decrypting an encrypted output received from the encrypted AI model, and decrypting an encrypted explanation and encrypted intermediate feature data. The key generating module 202 may send the generated public key to the data encrypting module 204 via a connector C1 and to a model encrypting module 210 (of the AI prediction and explanation device 104) via a connector C3. The key generating module 202 may further send the private encryption key to the decrypting and evaluating module 208 via a connector C2.

The data encrypting module 204 may receive an input data, via an interface I2. The input data may include a raw input (for example, a non-encrypted image) for which an output (inference) and the explanation are to be generated. For example, the output (inference) and the explanation may include recognition of the image and explanations supporting the recognition task. The data encrypting module 204 may further receive the public key from the key generating module 202. Upon receiving the input data and the public key, the data encrypting module 204 may perform the homomorphic encryption of the input data using the public key, to generate encrypted input data. It may be noted that the key generated using the homomorphic encryption may support simple arithmetic operations (linear functions), such as addition, multiplication and subtraction, on the encrypted input data. The data encrypting module 204 may send the encrypted input data to a decisioning module 212 (of the AI prediction and explanation device 104) via a connector C4.

The decrypting and evaluating module 208 may receive encrypted intermediate feature data (e.g., heat maps), encrypted feature data (e.g., image features), the encrypted AI model, and the private encryption key. For example, the decrypting and evaluating module 208 may receive the encrypted AI model from the decisioning module 212 (of the AI prediction and explanation device 104) via connector C7. Further, the decrypting and evaluating module 208 may receive the private encryption key from the key generating module 202 via a connector C2. Further, the decrypting and evaluating module 208 may receive the encrypted intermediate feature data from an explanation module 214 (of the AI prediction and explanation device 104), via a connector C8. In some embodiments, the decrypting and evaluating module 208 may decrypt the various encrypted data, using the private encryption key. By way of an example, the decrypting and evaluating module 208 may decrypt the encrypted intermediate feature data to generate decrypted intermediate feature data. The decrypting and evaluating module 208 may further decrypt the encrypted output to generate decrypted output, and decrypt the encrypted explanation to generate decrypted explanation.

In some embodiments, the decrypting and evaluating module 208 may detect potential mismatches due to degradations from the encrypted data and the encrypted AI model. The decrypting and evaluating module 208 may further point out impact of these potential mismatches. It may be understood that as several multiplications (for example, of weights of CNN model and input data) with large numbers (for example, the encryption keys, which may be large prime numbers) are involved, the product of such multiplications may lead to over flows and truncation errors. It may be further understood that the results (products of multiplication) may be sensitive to precision of weights, and intermediate values before modulo arithmetic operation may result in large numbers due to the usage of the encryption keys. The decrypting and evaluating module 208 may, therefore, provide for validating the correctness of encrypted output generated by the AI model and the correctness of the encrypted explanation for the encrypted output.

The rendering module 206 may receive the decrypted output from the decrypting and evaluating module 208 (generated by the AI prediction and explanation device 104 using the encrypted AI model). The rendering module 206 may further receive the decrypted explanation, and the decrypted intermediate feature data (generated by the AI prediction and explanation device 104) from the decrypting and evaluating module 208, via a connector C9. By way of an example, the decrypted intermediate feature data may include decrypted heat maps. It may be noted that the decrypted heat maps may help to visualize features that contributed to generation of the output by the encrypted AI model, and validating the explanation generated by the AI prediction and explanation device 104. The rendering module 206 may render the various decrypted data to a user (the various decrypted data may include decrypted output, the decrypted intermediate feature data and the decrypted explanation). For example, the rendering module 206 may render the various decrypted data on a screen of an electronic device.

The AI prediction and explanation device 104 may include various modules that perform various functions so as to provide explanation for output generated by the AI model. In some embodiments, the AI prediction and explanation device 104 may include a model encrypting module 210, a decisioning module 212, an explanation module 214, and a database 216.

The database 216 may store a pre-trained AI model. In some embodiments, the pre-trained AI model may include one or more machine learning (ML) or AI models, which are trained on unencrypted data or the raw data. It may be understood that training the ML and the AI models with the encrypted data may be a complex process in terms of time and memory, and due to that reason, pre-trained models may be used for working with the encrypted data. It may be noted that the homomorphic encryption may support only a limited set of computation functions (linear functions), such as addition, multiplication, and subtraction, in which the computation output remains conserved. It may be further noted that functions, such as division, non-linear activation, and comparison cannot be performed with the homomorphic mechanism, and for that reason, these operations may either be avoided or approximated depending on the criticality. Therefore, the pre-trained AI model may be first converted to an approximate model, and then model parameters may be encrypted by the model encrypting module 210. In some embodiments, the AI model may be trained with the real data (i.e. not the encrypted data), and upon encrypting, the AI model may be stored in the database 216. As training the AI model with the encrypted data is a complex process, the AI model may be approximated, so that all the computation can be performed in terms of addition and multiplication, which is supported by the homomorphic encryption.

The model encrypting module 210 may receive the pre-trained AI model from the database 216, via an interface 13. The model encrypting module 210 may further receive the public encryption key from the key generating unit 202 (of the client device 102), via a connector C3. Upon receiving the pre-trained AI model and the public encryption key, the model encrypting module 210 may generate an encrypted AI model by encrypting the pre-trained AI model using the public encryption key. In some embodiments, the model encrypting module 210 may generate the encrypted AI model based on homomorphic encryption. In some embodiments, in order to generate the encrypted AI model, the model encrypting module 210 may generate an approximate AI model based on the pre-trained AI model. It may be noted that the approximate AI model may include an approximate linear function corresponding to the non-linear activation function of the AI model. The model encrypting module 210 may further encrypt a plurality of model parameters of the approximate AI model, using the public encryption keys. The plurality of model parameters may include at least one of the approximate linear function and a plurality of weights of each node in each layer of the pre-trained AI model.

The decisioning module 212 may receive the AI model from the database 216 or the encrypted AI model from the model encrypting module 210, via a connector C10. Upon receiving the AI model or the encrypted AI model, the decisioning module 212 may perform various functions, such as addition, multiplication, weighted average, etc. so as to generate an output for the input data or an encrypted output for the encrypted input data, using the model parameters. It should be noted that, in some embodiments, the input data may be encrypted, while the model parameters may either be encrypted or encoded. Additionally, the decisioning module 212 may generate feature data for the input data or encrypted feature data for the encrypted input data, using the model parameters data. Further, in some embodiments, the decisioning module 212 may generate intermediate feature data or encrypted intermediate feature data from different intermediate layers of the AI model. For example, for convolutional neural network (CNN) based AI models, the decisioning module 212 may be configured to perform various functions, such as convolution, average (polynomial approximation). The convolution may be a weighted sum of encrypted image pixels and encrypted filter coefficients, average pooling may be a scaled addition of convolution output, and activation may be a polynomial computation. Upon performing the functions, the decisioning module 212 may generate intermediate feature data (for example, heat maps) or encrypted intermediate feature data (for example, encrypted heat maps). The decisioning module 212 may send the (encrypted) intermediate feature data to the decrypting and evaluating module 208 of the client device 102, via the connector C7. Further, the decisioning module 212 may send the (encrypted) output (for example, (encrypted) classification) along with the (encrypted) feature data (for example, (encrypted) image features) to the explanation module 214, via a connector C6. An exemplary decisioning module 212 is further explained in conjunction with FIG. 3.

Figure 3:
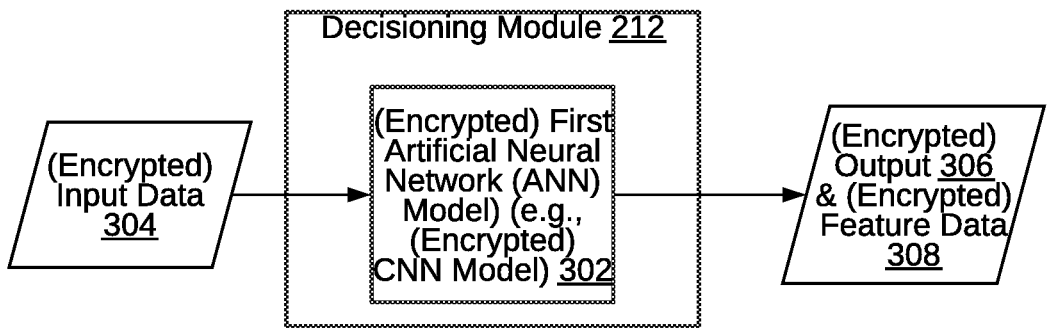
FIG. 3 is a block diagram of an exemplary decisioning module employing a part of the AI model, in accordance with some embodiments of the present disclosure.

Referring now to FIG. 3, a block diagram of an exemplary decisioning module 212 employing a part of the AI model is illustrated, in accordance with some embodiments of the present disclosure. In some embodiments, the decisioning module 212 may include a part of the AI model (say, first part) for generating output and feature data. In some embodiments, the AI model may be encrypted and, therefore, the first part of the AI model will be encrypted. In some embodiments, the first part of the AI model may be a first artificial neural network (ANN) 302. For example, the first ANN 302 may be a convolutional neural network (CNN) model. It may be understood that the CNN model may include various layers, whose arrangement may be altered according to use case scenario. During operation, the decisioning module 212 may receive (encrypted) input data 304. The first ANN model 302 may perform various functions (for example, addition, multiplication, weighted average, etc.) to generate an (encrypted) output 306 and an (encrypted) feature data 308 based on the (encrypted) input data 304. Additionally, as stated above, the first ANN model 302 may perform various functions to generate an (encrypted) intermediate feature data (not shown in FIG. 3).

The explanation module 214 may receive the feature data (or encrypted feature data) from the decisioning module 212. The explanation module 214 may then generate an (encrypted) explanation for the (encrypted) output based on the (encrypted) feature data using the (encrypted) AI model. It may be understood that the explanation module 214 may generate the (encrypted) explanation based on activation of various neurons of the (encrypted) AI model. The encrypted explanation may be decrypted at the client device 102 using the private encryption key. In some embodiments, the explanation module 214 may generate the encrypted explanation using a Long Short Term Memory (LSTM) model. An exemplary explanation module 214 is further explained in detail in conjunction with FIG. 4.

Figure 4:
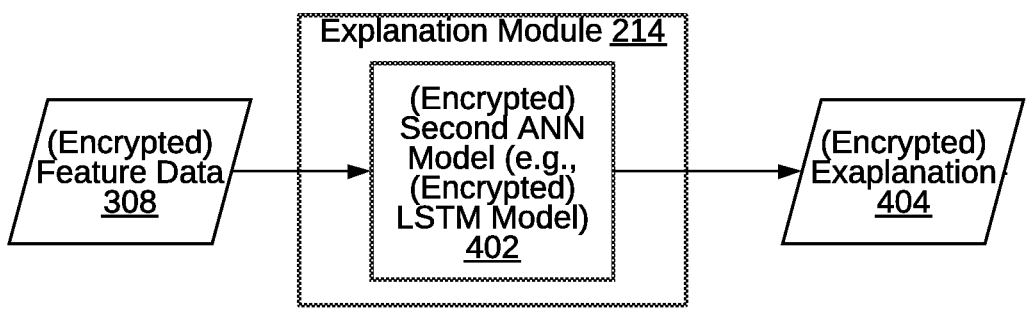
FIG. 4 is a block diagram of an exemplary explanation module employing another part of the AI model, in accordance with some embodiments of the present disclosure.

Referring now to FIG. 4, a block diagram of an exemplary explanation module 214 employing another part of the AI model is illustrated, in accordance with some embodiments of the present disclosure. In some embodiments, the explanation module 214 may include a part (say, second part) of the AI model for generating explanation for the output generated by the decisioning module 212. In some embodiments, the AI model may be encrypted and, therefore, the second part of the AI model will be encrypted. In some embodiments, the second part of the AI model may be a second ANN model 402. For example, the second ANN 402 model may be a Long Short Term Memory (LSTM) model. The explanation module 214 may receive (encrypted) feature data 308 generated by the decisioning module 212. The explanation module 214 may generate an (encrypted) explanation 404 based on the (encrypted) feature data 308.

In some embodiments, the second ANN model 402 may be pre-trained to generate a sequence of words as explanations based on input feature data (for example, input text and image features). The second ANN model 402 may learn words (i.e., the elements of vector representing the word) that need to be activated for the set of image features, as part of training. Further, during testing or generating explanation and inference, the second ANN model 402 may receive only feature data (e.g., image features) 308 as input. Based on previous correspondence (the learning at the time of training), the elements of the word vectors may be activated and the set of words for explanations may be generated. These encrypted embedded vectors may include the encrypted explanation, which may be decrypted at the client device 102, using the private encryption key.

In some embodiments, the explanation and inference generated by the exemplary explanation module 214 may include words represented as high dimensional embedded vectors, during training or testing. It may be understood that if the computation is performed with encrypted input data, the elements of embedded vectors will be in the encrypted form. A set of such encrypted embedded vector may form the explanation. It may be further understood that in the encrypted computation, the output generated may also be encrypted. For the CNN model, the output may be a class probability. Since these probability values are encrypted, the actual class cannot be decided based on the encrypted probability values unless it is decrypted. Hence, the encrypted inference (which is the encrypted probability values in case of CNN) may be sent to the client device 102, where it may be decrypted for identifying the correct class.

Figure 5:
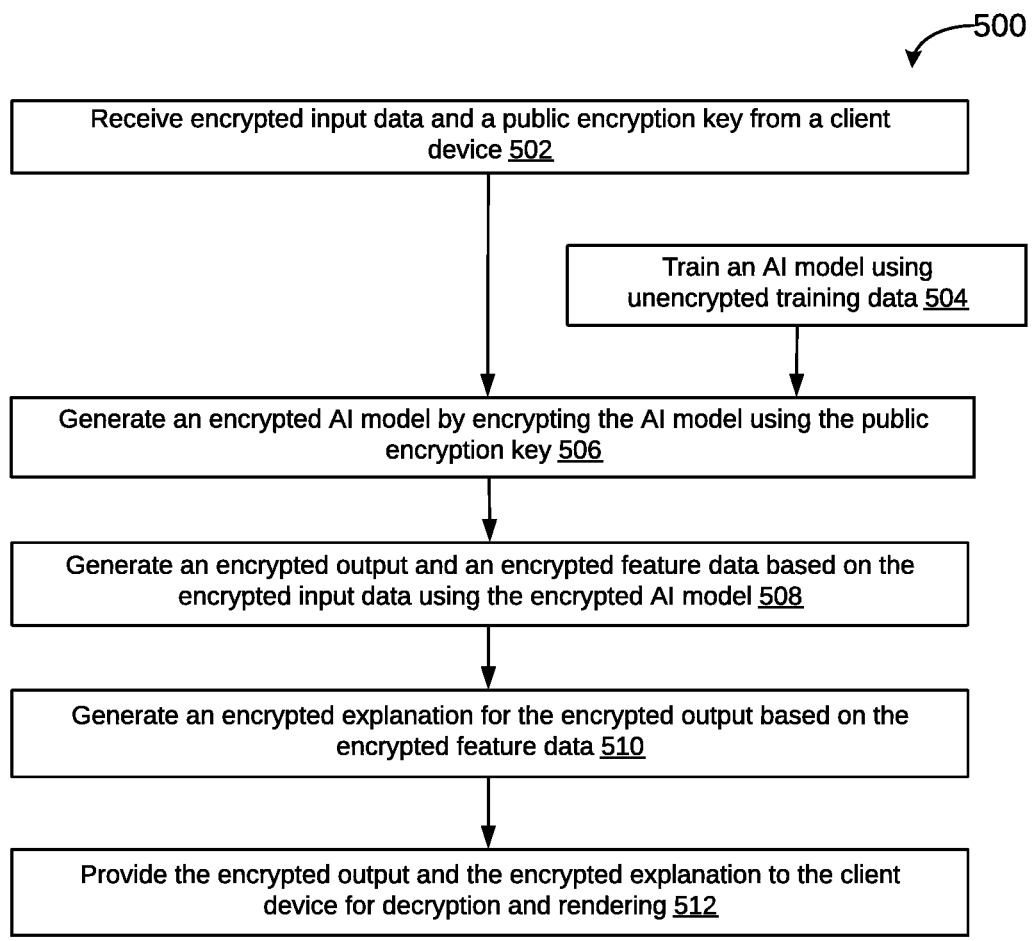
FIG. 5 is a flow diagram of an exemplary process for providing explanation for output generated by an AI model, in accordance with some embodiments of the present disclosure.

Referring now to FIG. 5, an exemplary process 500 for providing explanation for output generated by an AI model is depicted via a flowchart, in accordance with some embodiments of the present disclosure. In some embodiments, the process 500 may be performed by an AI prediction and explanation device 104. At step 502, encrypted input data and a public encryption key may be received from a client device 102. At step 506, an encrypted AI model may be generated by encrypting an AI model using the public encryption key. At step 508, an encrypted output and an encrypted feature data may be generated based on the encrypted input data using the encrypted AI model. At step 510, an encrypted explanation may be generated for the encrypted output based on the encrypted feature data. At step 512, the encrypted output and the encrypted explanation may be provided to the client device 102 for rendering. The encrypted output and the encrypted explanation may be decrypted by the client device 102 using a private encryption key. Additionally, at step 504, the AI model may be trained using unencrypted training data.

At step 502, the encrypted input data and the public encryption key may be received from the client device 102. As already mentioned, the client device 102 may be communicatively coupled to the AI prediction and explanation device 104 via a cloud network 106. It may be noted that the public encryption key may be generated using a homomorphic encryption algorithm. The private encryption key may be generated based on a user input. By way of an example, the user input may include a desired level of security, a desired level of computational complexity, and a number of key generation parameters.

At step 504, the AI model may be trained using unencrypted training data. The AI model may include a first artificial neural network (ANN) model 302 and a second ANN model 402. In some embodiments, the first ANN model 302 may be a convolutional neural network (CNN) model, and the second the ANN model 402 may be a long short-term memory (LSTM) model. At step 506, the encrypted AI model may be generated by encrypting the AI model using the public encryption key. In some embodiments, in order to generate the encrypted AI model, an approximate AI model may be generated based on the AI model. The approximate AI model may include an approximate linear function corresponding to the non-linear activation function of the AI model. Further, in order to generate the encrypted AI model, a plurality of model parameters of the approximate AI model may be encrypted using the public encryption keys. The plurality of model parameters may include at least the approximate linear function and a plurality of weights of each node in each layer of the AI model.

At step 508, the encrypted output and the encrypted feature data may be generated based on the encrypted input data using the encrypted AI model. In order to generate the encrypted output and the encrypted feature data, the first ANN model 302 may be employed. Further, a set of encrypted intermediate feature data may be generated corresponding to a set of layers of the first ANN model, and the set of encrypted intermediate feature data may be provided to the client device 102 for rendering. It may be noted that the set of encrypted intermediate feature data may be decrypted by the client device 102 using the private encryption key.

In some embodiments, the at least one of an encryption algorithm employed by the client device 102 for generation of the public and the private encryption keys or the encrypted AI model may be validated. The validating may include at a first pass, generating an output and a set of intermediate feature data corresponding to the set of layers of the first ANN model based on a probe data and the AI model. The validating may further include, at a second pass, generating the encrypted output and the set of encrypted intermediate feature data corresponding to the set of layers of the first ANN model based on an encrypted probe data and the encrypted AI model. The validating may further include providing the output and the set of intermediate feature data corresponding to the probe data as well as the encrypted output and the set of encrypted intermediate feature data corresponding to the encrypted probe data to the client device 102. The encrypted probe data output and the set of encrypted intermediate feature data may be decrypted by the client device 102 for comparison with the output and the set of intermediate feature data. The validation may be based on the comparison. In some further embodiments, the at least one of the encryption algorithm and the encrypted AI model may be retuned based on the comparison.

At step 510, the encrypted explanation may be generated for the encrypted output based on the encrypted feature data. The generating of the encrypted explanation may include employing the second ANN model 402. At step 512, the encrypted output and the encrypted explanation may be provided to the client device 102 for rendering. It may be noted that the encrypted explanation may be decrypted by the client device 102 using the private encryption key. It may be further noted that the private encryption key may be generated using the homomorphic encryption algorithm, and based on a user input. As mentioned earlier, the user input may include a desired level of security, a desired level of computational complexity, and a number of key generation parameters. At step 512, the encrypted output and the encrypted explanation may be provided to the client device 102 for rendering.

Figure 6:
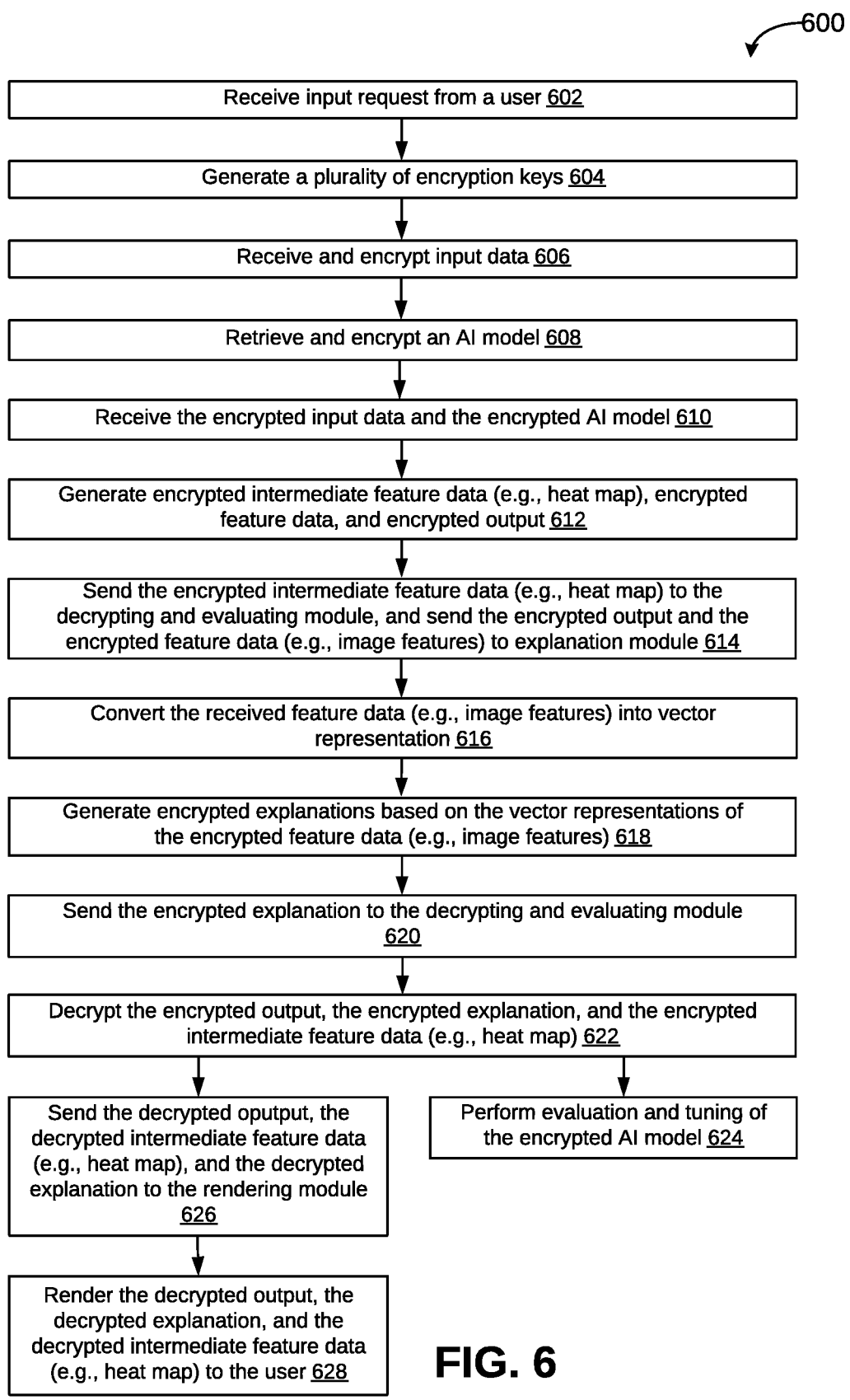
FIG. 6 is a flow diagram of a detailed exemplary process for providing explanation for output generated by an AI model, in accordance with some embodiments of the present disclosure.

Referring now to FIG. 6, an exemplary process 600 for providing explanation for output generated by an AI model is depicted in greater detail via a flowchart, in accordance with some embodiments of the present disclosure. In some embodiments, the process 600 may be performed by an AI prediction and explanation device 104 in conjunction with a client device 102. At step 602, an input request may be received from a user. At step 604, a plurality of encryption keys may be generated. At step 606, input data may be received from the user and encrypted. At step 608, an AI model may be retrieved from a database and encrypted. At step 610, the encrypted input data and the encrypted AI model may be received. At step 612, encrypted intermediate feature data (e.g., heat map), encrypted feature data, and encrypted output may be generated. At step 614, the encrypted intermediate feature data (e.g., encrypted heat map) may be sent to the decrypting and evaluating module 208, while the encrypted feature data (e.g., encrypted image features) and the encrypted output may be sent to the explanation module 214. At step 616, the received encrypted feature data (e.g., encrypted image features) may be converted into vector representation. At step 618, encrypted explanation may be generated based on the vector representations of the encrypted feature data (e.g., encrypted image features). At step 620, the encrypted explanation may be sent to the decrypting and evaluating module 208. At step 622, the encrypted output, the encrypted explanation, and the encrypted feature data (e.g., encrypted heat map) may be decrypted. At step 624, the evaluation and tuning of the encrypted AI model may be performed. At step 626, the decrypted output, the decrypted explanation, and the decrypted intermediate feature data (e.g., heat map) may be sent to the rendering module 206. At step 628, the decrypted output, the decrypted explanation, and the decrypted intermediate feature data (e.g., heat map) may be rendered to the user.

At step 602, an input request may be received by a key generating module 202 of a client device 102, from a user. In some embodiments, the input request may include strength of an encryption key that needs to be generated, and one or more relevant parameters. By way of an example, the relevant parameters may include a set of prime numbers, two constants, and a max order of a polynomial. At step 604, a plurality of encryption keys may be generated by the key generating module 202. The plurality of encryption keys may be generated based on a level of security through encryption and a level of computational complexity. In some embodiments, the plurality of encryption keys may include a public encryption key and a private encryption key. Further, the public encryption key and the private encryption may be generated using homomorphic encryption. It may be noted that the public encryption key may be used for encrypting the input data and the AI model, while the private encryption key may be used for decrypting the encrypted output, the encrypted explanation, and the encrypted intermediate feature data.

At step 606, the input data may be received from the user and encrypted. In some embodiments, the input data may be encrypted by a data encrypting module 204 of the client device 102. By way of an example, the input data may include one or more images and text information. It may be noted that the input data may be encrypted using the public encryption key. In some embodiment, relevant attributes in text explanation may be encrypted by the public encryption key, applied along with the input data. At step 608, the AI model may be retrieved from a database 216 and encrypted. The AI model may be encrypted by a model encrypting module 210 of the AI prediction and explanation device 104. The AI model may be a pre-trained AI model stored in a database 216. In some embodiments, the AI model may be trained using the unencrypted training data. In some embodiments, the AI model may be encrypted using the public encryption key. As stated above, the AI model may be, at first, approximated and, then, encrypted. At step 610, the encrypted input data and the encrypted AI model may be received by a decisioning module 212 of the AI prediction and explanation device 104. It may be understood that the encrypted input data may be received from the data encrypting module 204, and the encrypted AI model may be received from the model encrypting module 210.

At step 612, encrypted intermediate feature data (e.g., encrypted heat map), encrypted feature data, and encrypted output may be generated. The encrypted intermediate feature data (e.g., encrypted heat map) may be generated by the decisioning module 212 based on activation of various convolution filters in one or more intermediate layers of the AI model. Further, the encrypted feature data may include feature data (e.g., image features) including automatically learnt patches, parts of image that differentiates between the multiple images from the image classification, a set of patches or objects that help to identify an object in case of object detection problem. An exemplary CNN model implemented as a part of the AI model is explained in greater detail in conjunction with FIG. 7.

Figure 7:
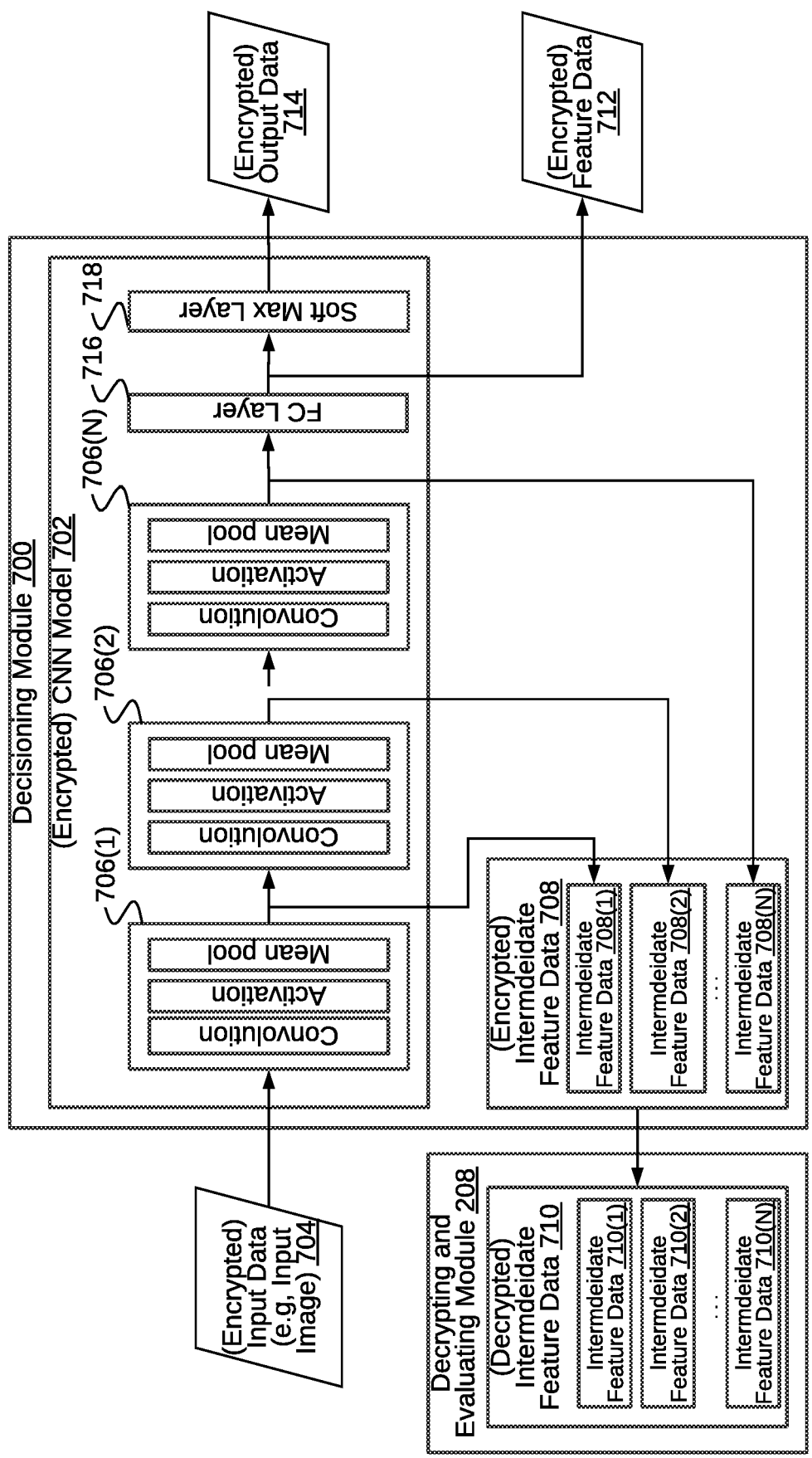
FIG. 7 is a detailed block diagram of an exemplary decisioning module employing a convolutional neural network (CNN) model, in accordance with some embodiments of the present disclosure.

Referring now to FIG. 7, a detailed block diagram of a decisioning module 700, analogous to the exemplary decisioning module 212 of the FIG. 2, is illustrated, in accordance with some embodiments of the present disclosure. The decisioning module 700 may include a convolutional neural network (CNN) model 702 as the AI model for generating output, feature data, intermediate feature data (e.g., heat map). In some embodiments, the AI model (i.e., the CNN model 702) may be encrypted or encoded. The decisioning module 700 may receive (encrypted) input data (for example, input image) 704. The encrypted input data may be encrypted using the public encryption key. The (encrypted) input data 704 may then pass through multiple convolution layers 706(1), 706(2) . . . 706(N), collectively referred to as convolution layers 706. For example, each layer of the multiple convolution layers 706 may include three sub-processes including convolution, activation, and mean (or average) pooling layers. It may be noted that an (encrypted) intermediate feature data (e.g., heat map) 708 may be generated after each layer of the convolutional layers 706 so as to visualize the explanation at different scales. For example, (encrypted) intermediate feature data 708(1) may be generated after the convolutional layer 706(1), (encrypted) intermediate feature data 708(2) may be generated after the convolutional layer 706(2), (encrypted) intermediate feature data 708(N) may be generated after the convolutional layer 706(N), and so on.

It may be understood that the generated (encrypted) intermediate feature data (e.g., encrypted heat map) 708 is for the (encrypted) input data 704, and proportionally representative of unencrypted intermediate feature data (heat map). As it will be appreciated by those skilled in the art, explanation along with the intermediate feature data (e.g., heat map) generated by the (encrypted) AI model 702 may be necessary at the client device 102 for proper understanding and validating of the explanation. It may be further noted that computation by the (encrypted) AI model 702 may be performed based on the (encrypted) input data 704 and (encrypted) model parameters. The convolution filters may extract patterns from the (encrypted) input data (e.g., image). These filters may be optimized during training for correct decision-making. By way of an example, for new images, some of the trained (optimized) filters may be activated based on the patterns available in the new image. A set of such filters, which may be highly activated at different convolutional layers 706 may form the intermediate feature data (heat map). In some embodiments, the intermediate feature data (heat map) may provide visual clues to understand the explanation. It may be understood that these filters may be encrypted, and therefore, the intermediate feature data (heat map) generated may also be encrypted. It may be understood that the correspondence between visual cue and text explanation may be obtained once the encrypted intermediate feature data (heat map) are decrypted. In some embodiments, the encrypted intermediate feature data (encrypted heat map) 708 may be decrypted by a decrypting and evaluating module 208 of a client device 102 so as to generate decrypted intermediate feature data (heat map) 710. Further, the encrypted model 702 may generate (encrypted) feature data 712 and (encrypted) output data 714. It may be noted that the (encrypted) feature data 712 may be generated by a Fully Connected (FC) layer 716, which is a layer after all the convolutional layers 706 and before the SoftMax layer 718, of the encrypted CNN model 702. Similarly, the (encrypted) output data 714 may be generated by the SoftMax layer 718 of the encrypted CNN model 702. In some embodiments, for example, during validating using probe data, the AI decisioning module 700 may employ unencrypted AI model 702 (e.g., CNN model), which may receive unencrypted probe data, and, therefore, generate unencrypted output, unencrypted explanation, and unencrypted intermediate feature data.

At step 614, the encrypted intermediate feature data (encrypted heat map) 708 may be sent to the decrypting and evaluating module 208 of the client device 102, while the encrypted output data 714 and the encrypted feature data (e.g., image features) 712 may be sent to the explanation module 214 of the AI prediction and explanation device 104. At step 616, the received feature data (e.g., image features) may be converted into vector representation by the explanation module 214. In some embodiments, the feature data (e.g., image features) and text features may be converted into the vector representations through a long short term memory (LSTM) model. The explanation module 214 and the LSTM model has already been explained in detail, in FIG. 2 and FIG. 4, respectively.

At step 618, an encrypted explanation may be generated based on the vector representations of the feature data (e.g., image features). The encrypted explanation may be generated by the explanation module 214 upon receiving the encrypted features data (for example, image features) from the decisioning module 212, as already explained in FIG. 2. In some embodiments, the encrypted explanation may be generated based on the activation of various neurons of a CNN model of the decisioning module 212.

At step 620, the encrypted explanation may be sent to the decrypting and evaluating module 208 of the client device 102. At step 622, the encrypted output, the encrypted explanation, and the encrypted feature data (e.g., encrypted heat map) may be decrypted by the decrypting and evaluating module 208 using the private encryption key provided by the key generating module 202. As will be appreciated, the decrypted explanation and feature data (e.g., heat map) may provide key features that may have impacted the output and, therefore, may help in understanding and validating the output. At step 624, evaluation and tuning of the encrypted AI model may be performed by the decrypting and evaluating module 208. Thus, potential mismatches due to degradations from the encrypted input data and the encrypted AI model, if any, may be detected, and its impact may be estimated. It may be understood that as several multiplications (typically between the weights of the CNN model and the input data) with large numbers (for example, encryption keys may be large prime numbers) may be involved, the intermediate partial products of the multiplication may lead to over flows and truncation errors. It may be further understood that the results may be sensitive to precision of the weights. For example, if a weight is approximated by a difference of 0.001, when it is multiplied by 100000001, the approximation would be 100000.001. The multiplication operation of sensitive pixels (of input image of the input data) with such large numbers may lead to large deviations between the values with and without the encryption. It may be noted that the modulo arithmetic may compensate for these deviations to some extent, however, deviations may add up to the module base before it goes to 0. Therefore, fine-tuning of the appropriate weights may be required as a part of the correction to ensure accurate results. In order to fine-tune the appropriate weights, probe data may be applied during the training of the CNN model, to obtain the intermediate feature data (heat map), as further explained in conjunction with FIG. 8.

Figure 8:
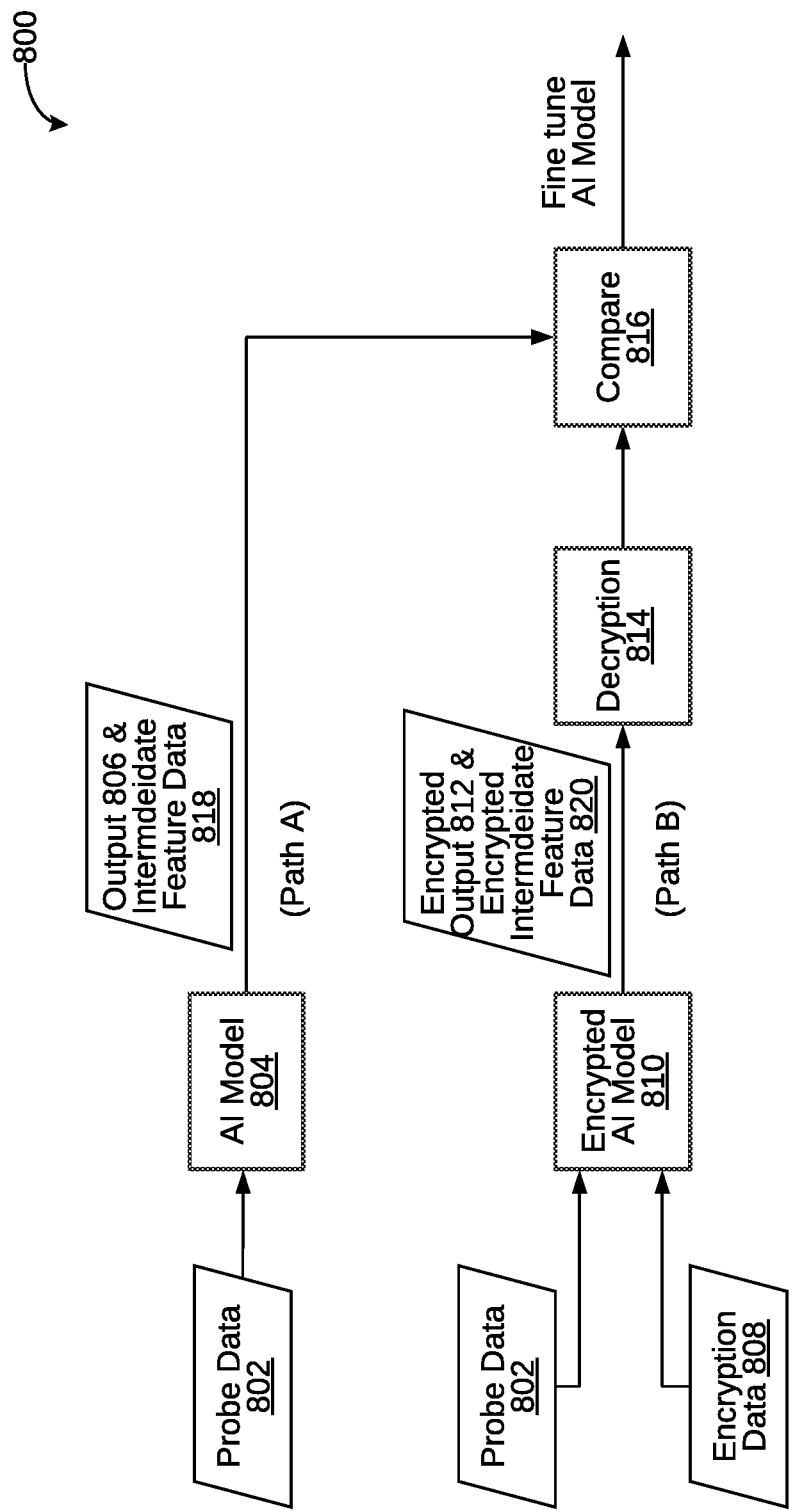
FIG. 8 is an exemplary process for validating and fine tuning an encryption algorithm or the encrypted AI model, in accordance with some embodiments of the present disclosure.

Referring now to FIG. 8, an exemplary process of validating and fine tuning an encryption algorithm (employed by the client device 102 for generation of the public and the private encryption keys) or the encrypted AI model (employed by the AI prediction and explanation module 104 for generation of output and corresponding explanation) is illustrated, in accordance with some embodiments of the present disclosure. At a first pass (path A) an output (for example, a class) 806 and a set of intermediate feature data 818 may be generated based on a probe data 802 (i.e., unencrypted standard input data) and an AI model 804. It may be understood that the output 806 and the set of intermediate feature data 818 may be generated corresponding to a set of layers of a first ANN model 302 (i.e. a CNN model). Further, at a second pass (path B), an encrypted output 812 and the set of encrypted intermediate feature data 820 may be generated, corresponding to the set of layers of the first ANN model 302, based on encrypted probe data (i.e., standard input data encrypted using the encryption data 808) and an encrypted AI model 810 (i.e., AI model encrypted using the encryption data 808). Thereafter, the output 806 and the set of intermediate feature data 818 corresponding to the probe data 802 may be provided to the client device 102. Similarly, the encrypted output 812 and the set of encrypted intermediate feature data 820 corresponding to the encrypted probe data 802 may be provided to the client device 102. The encrypted output 812 and the set of encrypted intermediate feature data 818 may be decrypted at block 814 by the client device 102 and compared at block 816 with the corresponding output 806 and the set of intermediate feature data 818.

It may be noted that any deviation determined based on the comparison may be attributed to the encryption process. If the deviation is observed in highly relevant part of the intermediate feature data (heat map), or if there is a mismatch in the output (e.g., class) 806 generated based on the probe data 802 and the output (e.g., class) 812 generated based on the probe data 802 and the encryption data 808, a correction may be performed. Accordingly, a user may fine tune the AI model by switching over to another encryption key. The process may be repeated with other probe data as appropriate for the features of the classifier. As will be appreciated by those skilled in the art, in some embodiments, a mismatch in the intermediate feature data (e.g., heat map) may be acceptable, but a mismatch in the output (e.g., classification) may not be acceptable. It may be understood that, in some embodiments, the data fed as the probe data, the comparison, as well as tuning may be performed by a human expert.

Returning back to FIG. 6, at step 626, the decrypted output, the decrypted explanation, and the decrypted intermediate feature data (e.g., heat map) may be sent to the rendering module 206. As already explained in FIG. 2, the rendering module 206 may receive the decrypted output generated using the encrypted AI model and the encrypted input data, the decrypted explanation for the output generated by the encrypted AI model, and the decrypted intermediate feature data (e.g., heat map).

At step 626, the decrypted output, the decrypted explanation, and the decrypted intermediate feature data (e.g., heat map) may be rendered to a user (e.g., displayed on a screen of an electronic device) by the rendering module 206. In some embodiments, the layer wise activations may be provided to the user from the AI model that runs over the encrypted input data. The model architecture may be made available to the client device 102, as it is independent of the input data or the weights. The decoded activations may be mapped over the architecture of the network to visualize the layer wise relevance and activations in the form of heat map and activation map respectively. It may be understood that the above may be in addition to the textual explanation that is decrypted at the user end.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 9:
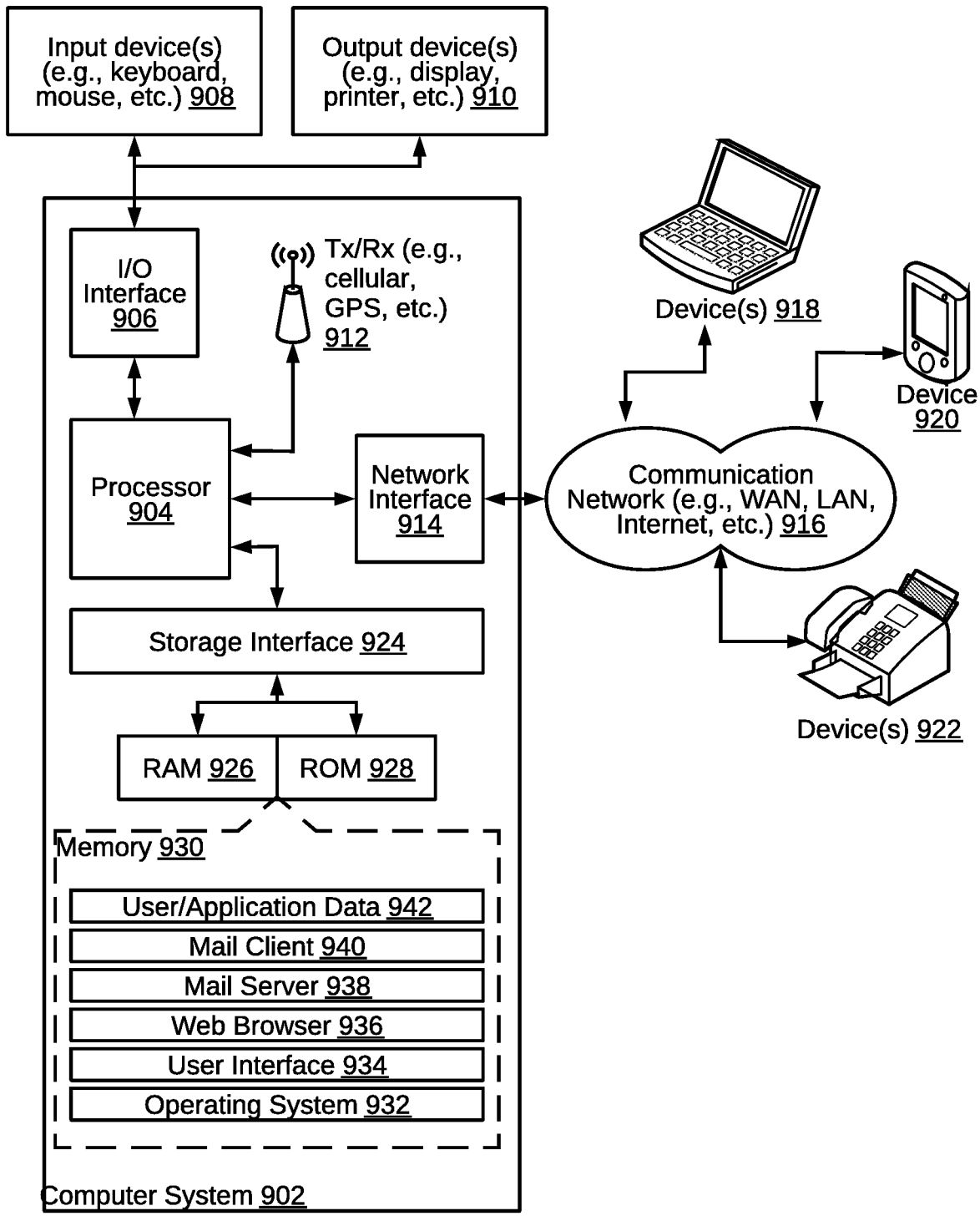
FIG. 9 is a computer system for implementing embodiments consistent with the present disclosure.

The disclosed methods and systems may be implemented on a conventional or a general-purpose computer system, such as a personal computer (PC) or server computer. Referring now to FIG. 9, a block diagram of an exemplary computer system 902 for implementing embodiments consistent with the present disclosure is illustrated. Variations of computer system 902 may be used for implementing system 100 for providing an explanation for output generated by an AI model. Computer system 902 may include a central processing unit ("CPU" or "processor") 902. Processor 902 may include at least one data processor for executing program components for executing user-generated or system-generated requests. A user may include a person, a person using a device such as those included in this disclosure, or such a device itself. The processor 902 may include specialized processing units such as integrated system (bus) controllers, memory management control units, floating point units, graphics processing units, digital signal processing units, etc. The processor 902 may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 902 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 902 may be disposed in communication with one or more input/output (I/O) devices via I/O interface 906. The I/O interface 906 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 906, the computer system 902 may communicate with one or more I/O devices. For example, the input device 908 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 910 may be a printer, fax machine, video display (e.g., cathode ray tube (CRT), liquid crystal display (LCD), light-emitting diode (LED), plasma, or the like), audio speaker, etc. In some embodiments, a transceiver 912 may be disposed in connection with the processor 902. The transceiver 912 may facilitate various types of wireless transmission or reception. For example, the transceiver 912 may include an antenna operatively connected to a transceiver chip (e.g., TEXAS INSTRUMENTS® WILINK WL1283®, BROADCOM® BCM4750IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 902 may be disposed in communication with a communication network 916 via a network interface 914. The network interface 914 may communicate with the communication network 916. The network interface 914 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 916 may include, without limitation, a direct interconnection, local area network (LAN), wide area network (WAN), wireless network (e.g., using Wireless Application Protocol), the Internet, etc. Using the network interface 914 and the communication network 916, the computer system 902 may communicate with devices 918, 920, and 922. These devices 918, 920, and 922 may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK®, etc.), laptop computers, notebooks, gaming consoles (MICROSOFT® XBOX®, NINTENDO® DS®, SONY® PLAYSTATION®, etc.), or the like. In some embodiments, the computer system 902 may itself embody one or more of these devices 918, 920, and 922.

In some embodiments, the processor 902 may be disposed in communication with one or more memory devices (e.g., RAM 926, ROM 928, etc.) via a storage interface 924. The storage interface 924 may connect to memory devices 930 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 930 may store a collection of program or database components, including, without limitation, an operating system 932, a user interface application 934, a web browser 936, a mail server 938, a mail client 940, user/application data 942 (e.g., any data variables or data records discussed in this disclosure), etc. The operating system 932 may facilitate resource management and operation of the computer system 902. Examples of operating systems 932 include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 934 may facilitate display, execution, interaction, manipulation, or operation of program components through textual or graphical facilities. For example, user interfaces 934 may provide computer interaction interface elements on a display system operatively connected to the computer system 902, such as cursors, icons, check boxes, menus, scrollers, windows, widgets, etc. Graphical user interfaces (GUIs) may be employed, including, without limitation, APPLE® MACINTOSH® operating systems' AQUA®, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 902 may implement a web browser 936 stored program component. The web browser 936 may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers 936 may utilize facilities such as AJAX®, DHTML, ADOBE® FLASH®, JAVASCRIPT®, JAVA®, application programming interfaces (APIs), etc. In some embodiments, the computer system 902 may implement a mail server 938 stored program component. The mail server 938 may be an Internet mail server such as MICROSOFT® EXCHANGE®, or the like. The mail server 938 may utilize facilities such as ASP, ActiveX, ANSI C++/C#, MICROSOFT .NET®, CGI scripts, JAVA®, JAVASCRIPT®, PERL®, PHP®, PYTHON®, WebObjects, etc. The mail server 938 may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 902 may implement a mail client 940 stored program component. The mail client 940 may be a mail viewing application, such as APPLE MAIL®, MICROSOFT ENTOURAGE®, MICROSOFT OUTLOOK®, MOZILLA THUNDERBIRD®, etc.

In some embodiments, computer system 902 may store user/application data 942, such as the data, variables, records, etc. (e.g., input data, encryption algorithm, encrypted input data, public and private encryption keys, encrypted output data, encrypted explanation data, encrypted intermediate feature data, decrypted output data, decrypted explanation data, decrypted intermediate feature data, AI model data, approximate AI model data, encrypted AI model data, encrypted feature data, etc.) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems 902 discussed above in this disclosure. It is to be understood that the structure and operation of the any computer or database component may be combined, consolidated, or distributed in any working combination.

As will be appreciated by those skilled in the art, the techniques described in the various embodiments discussed above provide for explaining the output generated by an AI model. In particular, the techniques provide for using an encrypted AI model for processing encrypted input data for obtaining an encrypted output. As a result, the security and privacy of data is ensured, especially when the AI model is implemented on a cloud network. The techniques use a CNN model as the AI model for generating intermediate feature data (for example, heat map) for each layer of the AI model. By way of an example, the heat map may include a set of image features comprising automatically learnt patches, parts of image that differentiates between the multiple images from the image classification, a set of patches or objects that help to identify an object in case of object detection problem, and so forth. The techniques further use a Long Short Term Memory (LSTM) model for generating encrypted explanation, for the encrypted output data, based on the encrypted feature data. The techniques further provide for decrypting the encrypted output, the encrypted explanation, and the encrypted intermediate feature data so as to provide adequate explanations to the output generated, and visualization of the features relied on by the AI model for generating the output. The decrypted heat map helps a user validate the explanations and output through these visualizations. Overall, the techniques provide for making the business process of data analysis more secure and understandable.

The specification has described method and system for providing explanation to the output generated by the AI model. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for providing explanation for output generated by an artificial intelligence (AI) model, the method comprising:
   receiving, by an AI prediction and explanation device, encrypted input data and a public encryption key from a client device, wherein the encrypted input data is encrypted using the public encryption key;
   generating, by the AI prediction and explanation device, an encrypted AI model by encrypting an AI model using the public encryption key;
   generating, by the AI prediction and explanation device, an encrypted output, an encrypted feature data, and an encrypted intermediate feature data based on the encrypted input data using the encrypted AI model;
   generating, by the AI prediction and explanation device, an encrypted explanation for the encrypted output based on the encrypted feature data; and
   providing, by the AI prediction and explanation device, the encrypted output, the encrypted explanation, and the encrypted intermediate feature data to the client device for rendering and validation, wherein the encrypted output, the encrypted explanation and the encrypted intermediate feature data are decrypted by the client device using a private encryption key to generate output, explanation and intermediate feature data at client device; wherein validation comprises validating correctness of the encrypted output and encrypted explanation using the intermediate feature data, wherein the intermediate feature data comprise decrypted heat maps which provide visual clues of features that contributed to generation of the output and the explanation.

2. The method of claim 1, wherein the public and the private encryption keys are generated:
   using a homomorphic encryption algorithm; or
   based on a user input comprising a desired level of security, a desired level of computational complexity, or a number of key generation parameters.

3. The method of claim 1, further comprising:
   generating, by the AI prediction and explanation device, an approximate AI model based on the AI model, wherein the approximate AI model comprises an approximate linear function corresponding to a non-linear activation function of the AI model; and
   encrypting, by the AI prediction and explanation device, a plurality of model parameters of the approximate AI model using the public encryption keys, wherein the plurality of model parameters comprises at least the approximate linear function and a plurality of weights of each node in each layer of the AI model.

4. The method of claim 1, wherein the AI model comprises a first artificial neural network (ANN) model and a second ANN model and the method further comprises employing, by the AI prediction and explanation device, the first ANN model to generate the encrypted output and the encrypted feature data and the second ANN model to generate the encrypted explanation.

5. The method of claim 4, further comprising:
   generating, by the AI prediction and explanation device, a set of encrypted intermediate feature data corresponding to a set of layers of the first ANN model; and
   providing, by the AI prediction and explanation device, the set of encrypted intermediate feature data to the client device for rendering and decryption using the private encryption key.

6. The method of claim 5, further comprising:
   validating, by the AI prediction and explanation device, at least one of an encryption algorithm employed by the client device for generation of the public and the private encryption keys or the encrypted AI model, comprising:
   at a first pass, generating, by the AI prediction and explanation device, an output and a set of intermediate feature data corresponding to the set of layers of the first ANN model based on a probe data and the AI model;
   at a second pass, generating, by the AI prediction and explanation device, the encrypted output and the set of encrypted intermediate feature data corresponding to the set of layers of the first ANN model based on an encrypted probe data and the encrypted AI model; and
   providing, by the AI prediction and explanation device, the output and the set of intermediate feature data corresponding to the probe data as well as the encrypted output and the set of encrypted intermediate feature data corresponding to the encrypted probe data to the client device.

7. The method of claim 1, wherein validation further comprising detecting potential mismatches due to degradations from the encrypted data and the encrypted AI model, and performing fine tuning of the encryption algorithm or the encrypted AI model.

8. An artificial intelligence (AI) prediction and explanation device, comprising:
    a processor; and
    a memory communicatively coupled to the processor and storing instructions that, when executed by the processor, cause the processor to:
        receive encrypted input data and a public encryption key from a client device, wherein the encrypted input data is encrypted using the public encryption key;
        generate an encrypted AI model by encrypting an AI model using the public encryption key;
        generate an encrypted output, an encrypted feature data and encrypted intermediate feature data based on the encrypted input data using the encrypted AI model;
        generate an encrypted explanation for the encrypted output based on the encrypted feature data; and
        provide the encrypted output, the encrypted explanation and the encrypted intermediate feature data to the client device for rendering and validation, wherein the encrypted output, the encrypted explanation and the encrypted intermediate feature data are decrypted by the client device using a private encryption key to generate output, explanation and intermediate feature data at client device; wherein validation comprises validating correctness of the encrypted output and encrypted explanation using the intermediate feature data, wherein the intermediate feature data comprise decrypted heat maps which provide visual clues of features that contributed to generation of the output and the explanation.

9. The AI prediction and explanation device of claim 8, wherein the public and the private encryption keys are generated:
    using a homomorphic encryption algorithm; or
    based on a user input comprising a desired level of security, a desired level of computational complexity, or a number of key generation parameters.

10. The AI prediction and explanation device of claim 8, wherein the instructions, when executed by the processor, further cause the processor to:
    generate an approximate AI model based on the AI model, wherein the approximate AI model comprises an approximate linear function corresponding to a non-linear activation function of the AI model; and
    encrypt a plurality of model parameters of the approximate AI model using the public encryption keys, wherein the plurality of model parameters comprises at least the approximate linear function and a plurality of weights of each node in each layer of the AI model.

11. The AI prediction and explanation device of claim 8, wherein the AI model comprises a first artificial neural network (ANN) model and a second ANN model and the instructions, when executed by the processor, further cause the processor to employ the first ANN model to generate the encrypted output and the encrypted feature data and the second ANN model to generate the encrypted explanation.

12. The AI prediction and explanation device of claim 11, wherein the instructions, when executed by the processor, further cause the processor to:
    generate a set of encrypted intermediate feature data corresponding to a set of layers of the first ANN model; and
    provide the set of encrypted intermediate feature data to the client device for rendering and decryption using the private encryption key.

13. The AI prediction and explanation device of claim 12, wherein the instructions, when executed by the processor, further cause the processor to:
    validate at least one of an encryption algorithm employed by the client device for generation of the public and the private encryption keys or the encrypted AI model, comprising:
        at a first pass, generate an output and a set of intermediate feature data corresponding to the set of layers of the first ANN model based on a probe data and the AI model;
        at a second pass, generate the encrypted output and the set of encrypted intermediate feature data corresponding to the set of layers of the first ANN model based on an encrypted probe data and the encrypted AI model; and
        provide the output and the set of intermediate feature data corresponding to the probe data as well as the encrypted output and the set of encrypted intermediate feature data corresponding to the encrypted probe data to the client device.

14. A non-transitory computer-readable medium having stored thereon instructions for providing explanation for output generated by an artificial intelligence (AI) model comprising executable code which when executed by one or more processors, causes the one or more processors to:
    receive encrypted input data and a public encryption key from a client device, wherein the encrypted input data is encrypted using the public encryption key;
    generate an encrypted AI model by encrypting an AI model using the public encryption key;
    generate an encrypted output, an encrypted feature data and an encrypted intermediate feature data based on the encrypted input data using the encrypted AI model;
    generate an encrypted explanation for the encrypted output based on the encrypted feature data; and
    provide the encrypted output, the encrypted explanation and the encrypted intermediate feature data to the client device for rendering and validation, wherein the encrypted output, the encrypted explanation and the encrypted intermediate feature data are decrypted by the client device using a private encryption key to generate output, explanation and intermediate feature data at client device; wherein validation comprises validating correctness of the encrypted output and encrypted explanation using the intermediate feature data, wherein the intermediate feature data comprise decrypted heat maps which provide visual clues of features that contributed to generation of the output and the explanation.

15. The non-transitory computer-readable medium of claim 14, wherein the public and the private encryption keys are generated:
    using a homomorphic encryption algorithm; or
    based on a user input comprising a desired level of security, a desired level of computational complexity, or a number of key generation parameters.

16. The non-transitory computer-readable medium of claim 14, wherein the executable code, when executed by the processors, further causes the processors to:
    generate an approximate AI model based on the AI model, wherein the approximate AI model comprises an approximate linear function corresponding to a non-linear activation function of the AI model; and encrypt a plurality of model parameters of the approximate AI model using the public encryption keys, wherein the plurality of model parameters comprises at least the approximate linear function and a plurality of weights of each node in each layer of the AI model.

17. The non-transitory computer-readable medium of claim 14, wherein the AI model comprises a first artificial neural network (ANN) model and a second ANN model and the executable code, when executed by the processors, further causes the processors to employ the first ANN model to generate the encrypted output and the encrypted feature data and the second ANN model to generate the encrypted explanation.

18. The non-transitory computer-readable medium of claim 17, wherein the executable code, when executed by the processors, further causes the processors to:
   generate a set of encrypted intermediate feature data corresponding to a set of layers of the first ANN model; and
   provide the set of encrypted intermediate feature data to the client device for rendering and decryption using the private encryption key.

19. The non-transitory computer-readable medium of claim 18, wherein the executable code, when executed by the processors, further causes the processors to:
   validate at least one of an encryption algorithm employed by the client device for generation of the public and the private encryption keys or the encrypted AI model, comprising:
      at a first pass, generate an output and a set of intermediate feature data corresponding to the set of layers of the first ANN model based on a probe data and the AI model;
      at a second pass, generate the encrypted output and the set of encrypted intermediate feature data corresponding to the set of layers of the first ANN model based on an encrypted probe data and the encrypted AI model; and
   provide the output and the set of intermediate feature data corresponding to the probe data as well as the encrypted output and the set of encrypted intermediate feature data corresponding to the encrypted probe data to the client device.

* * * * *